(12) United States Patent
Chernoff et al.

(10) Patent No.: US 7,140,672 B2
(45) Date of Patent: Nov. 28, 2006

(54) INTEGRATED FRONT ASSEMBLY

(75) Inventors: Adrian B. Chernoff, Royal Oak, MI (US); Tommy E. White, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/768,723

(22) Filed: Jan. 30, 2004

(65) Prior Publication Data

US 2005/0168014 A1    Aug. 4, 2005

(51) Int. Cl.
*B62D 25/00* (2006.01)
*B62D 25/08* (2006.01)
*B62D 25/10* (2006.01)
*B62D 25/14* (2006.01)
*B60R 27/00* (2006.01)

(52) U.S. Cl. .................... 296/192; 296/70; 296/198; 296/193.11

(58) Field of Classification Search ........... 296/190.08, 296/192, 193.04, 70, 198, 193.11
See application file for complete search history.

(56) References Cited

U.S. PATENT DOCUMENTS

| | | | |
|---|---|---|---|
| 4,046,415 A | 9/1977 | Klees et al. ................ 296/35 |
| 4,431,221 A | 2/1984 | Jahnle ....................... 293/122 |
| 4,805,522 A * | 2/1989 | Tonoe et al. ................ 454/127 |
| 4,993,737 A | 2/1991 | Torcomian ................. 280/407 |
| 5,058,016 A | 10/1991 | Davidovitch ........... 364/424.01 |
| 5,372,026 A * | 12/1994 | Roper ........................... 72/60 |
| 5,388,885 A | 2/1995 | Warren ....................... 296/203 |
| 5,482,230 A | 1/1996 | Bird et al. .................. 244/121 |
| 5,673,929 A | 10/1997 | Alatalo ........................ 280/690 |
| 5,729,463 A | 3/1998 | Koenig et al. ......... 364/468.04 |
| 5,787,585 A | 8/1998 | Rashid ....................... 29/897.2 |
| 5,829,824 A | 11/1998 | Yamamuro et al. ........ 296/204 |
| 5,863,093 A | 1/1999 | Novoa et al. .......... 296/190.01 |
| 5,924,764 A | 7/1999 | Eipper et al. ............... 296/189 |
| 5,944,371 A | 8/1999 | Steiner et al. ........... 296/26.09 |
| 6,108,193 A | 8/2000 | Haberstroh ................. 361/600 |
| 6,250,710 B1 | 6/2001 | Matsuzaki .................. 296/188 |
| 6,276,228 B1 * | 8/2001 | Hoerster ....................... 74/512 |
| 6,470,990 B1 | 10/2002 | Panoz ........................ 180/311 |
| 6,474,713 B1 | 11/2002 | Ruck et al. ................ 296/24.1 |
| 6,755,461 B1 * | 6/2004 | Seksaria et al. ........ 296/193.04 |
| 6,793,275 B1 * | 9/2004 | Chernoff et al. ....... 296/193.11 |

(Continued)

OTHER PUBLICATIONS

U.S. Appl. No. 10/263,171, filed Feb. 2003, Panoz.
U.S. Appl. No. 10/271,460, filed May 2003, Seksaria.

(Continued)

*Primary Examiner*—Jason Morrow
(74) *Attorney, Agent, or Firm*—Kathryn A. Marra

(57) ABSTRACT

Front structure for a vehicle includes a unitary panel formed to define a vehicle cowl and a vehicle bulkhead. The vehicle cowl may form an air intake plenum. The unitary panel is configured to at least partially define a front compartment of the vehicle. An alternative unitary panel is formed to define a hood having inner and outer panel portions and, optionally, fenders. Another alternative unitary panel is formed to define a cowl, a bulkhead and a hood. The preferable method for forming the panels is quick plastic forming, superplastic forming or sheet hydroforming.

17 Claims, 2 Drawing Sheets

U.S. PATENT DOCUMENTS

2003/0030303 A1    2/2003  Panoz
2003/0085579 A1    5/2003  Seksaria
2003/0085591 A1    5/2003  Seksaria
2003/0085592 A1    5/2003  Seksaria
2003/0192362 A1*  10/2003  Carsley et al. ................ 72/312
2004/0050128 A1*   3/2004  Kleber et al. .................. 72/60

OTHER PUBLICATIONS

U.S. Appl. No. 10/271,462, filed May 2003, Seksaria.
U.S. Appl. No. 10/271,904, filed May 2003, Seksaria.

* cited by examiner

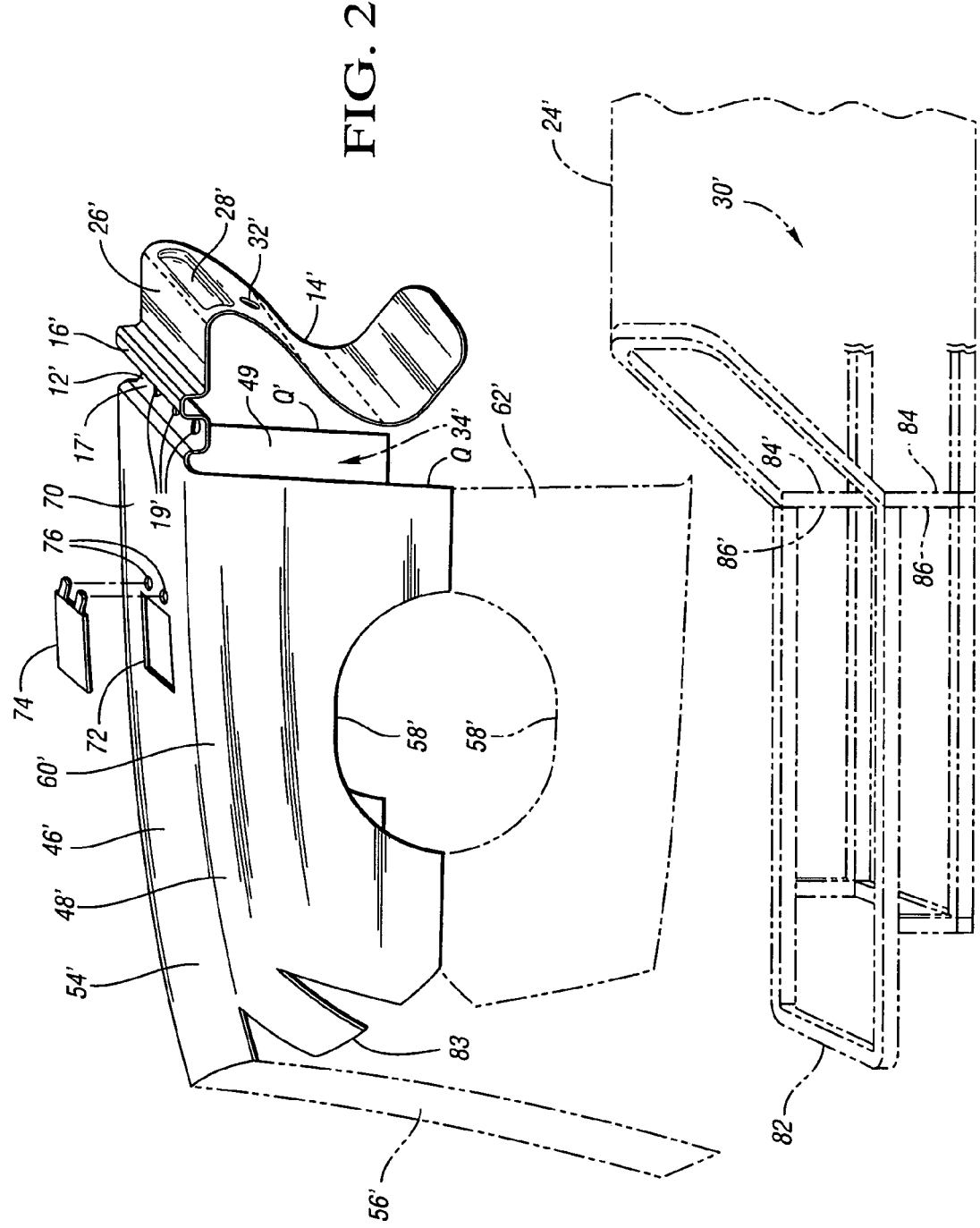

INTEGRATED FRONT ASSEMBLY

TECHNICAL FIELD

This invention relates to vehicle front structure and vehicle body panels; specifically, a vehicle cowl, an air intake plenum, a bulkhead, a hood and fenders.

BACKGROUND OF THE INVENTION

A typical prior art vehicle requires a plurality of components to form and define the front compartment of the vehicle. For instance, a vehicle body typically includes a hood and two fenders. The hood and two fenders are mounted to various vehicle frame members, such as upper rails, a cowl bar and an upper tie bar. A hood is generally formed from an outer panel and one or more inner panels to provide additional structural support. Each of these components requires a number of separate assembly and welding or other connecting processes to connect to the vehicle.

A vehicle bulkhead may be a plurality of separate pieces or a unitary, cast bulkhead. As used herein, "bulkhead" refers to a generally upright partition partially or completely separating the front compartment from the passenger compartment. Typically, a cowl (also commonly referred to as a cowl bar) is a separate component from the bulkhead. As used herein, "cowl" refers to the vehicle panel or structure generally located between the hood and the windshield of a vehicle and transversely spanning the vehicle. Cowls are often designed to support windshield wipers. Cowls may or may not be designed to bear transverse loads acting upon the vehicle; a separate vehicle crossbeam extending across the front compartment may be required for this purpose. Additionally, a separate panel-like component is generally provided to form an air intake plenum at the front compartment of the vehicle.

SUMMARY OF THE INVENTION

By utilizing quick plastic forming, superplastic forming and sheet hydroforming, vehicle body panels and other vehicle structures may be formed of more complex shapes. For instance, a body panel may be formed using one of the above methods and then bent (optionally to form inner and outer portions, providing the panel with additional strength).

Front structure for a vehicle includes a unitary panel formed to at least partially define a vehicle cowl and a vehicle bulkhead. As used herein, "unitary" means a continuous, one-piece panel. The vehicle cowl may form an air intake plenum. The unitary panel may be formed using a method selected from the group consisting of quick plastic forming, superplastic forming and sheet hydroforming. The unitary panel is further configured to at least partially define the front compartment of the vehicle.

In another aspect of the invention, the unitary panel may define a hood configured to extend across and over the front compartment. The unitary panel may be bendable to define a hood inner panel portion and a hood outer panel portion. The hood inner panel portion is juxtaposed with the hood outer panel portion and located inboard thereof. Additionally, the unitary panel may be bendable to further define two opposing fender portions extending generally downward from the hood.

In another aspect of the invention, each of the two opposing fender portions is bendable to define a fender outer panel portion and a fender inner panel portion. The fender inner panel portion is juxtaposed with the fender outer panel portion and is located inboard thereof when so bent.

In another aspect of the invention, the hood defines an access opening for the front compartment. An access door is connectable to the hood for opening and closing the access opening. The access door is especially useful when the hood is designed to be "locked down" to the vehicle (i.e., is not openable or closeable).

In another aspect of the invention, the cowl is configured to extend across the front compartment, and the bulkhead is configured to at least partially separate the front compartment from a passenger compartment of a vehicle.

In another aspect of the invention, the cowl comprises a structural crossbeam that extends across the front compartment.

In another aspect of the invention, the crossbeam is formed between the plenum and the vehicle bulkhead.

In another aspect of the invention, the unitary panel further defines structure forming a vehicle dashboard and configured for attachment with respect to an instrument panel.

Within the scope of the invention, the unitary panel may be formed to integrally define frame portions of the vehicle. Alternatively, the unitary panel may be configured for a vehicle using body-on-frame architecture. The unitary panel may be configured such that a forward edge of each of two front hinge pillars on the vehicle substantially continuously abuts the unitary panel when the unitary panel is operatively connected to the vehicle.

In another aspect of the invention, the unitary panel described above (formed to define a cowl and a bulkhead) is adapted to receive a hood (i.e., a separate hood) that extends over and across and further defines the front compartment of the vehicle.

A body panel for a vehicle includes a unitary panel formed to at least partially define a hood. The hood is bendable to define a hood outer panel portion and a hood inner panel portion. The hood inner panel portion is juxtaposed with the hood outer panel portion and is located inboard thereof when so bent. The unitary panel may be formed using the method selected from the group consisting of quick plastic forming, superplastic forming and sheet hydroforming. The unitary panel at least partially defines the front compartment of a vehicle.

In another aspect of the invention, the unitary panel defining the body panel is bendable to further define two opposing fenders extending from the hood.

In another aspect of the invention, each of the two opposing fender portions is bendable to define a fender outer panel portion and a fender inner panel portion. The fender inner panel portion is juxtaposed with the fender outer panel portion and is located inboard thereof when so bent.

In another aspect of the invention, front structure for a vehicle includes a unitary panel formed to at least partially define a vehicle cowl, a vehicle bulkhead, a hood and two opposing fender portions extending from the hood. The unitary panel may be formed using the method selected from the group consisting of quick plastic forming, superplastic forming and sheet hydroforming. The unitary panel at least partially defines the front compartment of a vehicle.

A method of manufacturing front structure for a vehicle includes forming a unitary panel using a method selected from the group consisting of quick plastic forming, superplastic forming and sheet hydroforming. The unitary panel at least partially defines a vehicle cowl and a vehicle bulkhead and, optionally, a hood.

In one aspect of the invention, the method may include bending the unitary panel to define the cowl, the bulkhead and the hood.

The above objects, features and advantages, and other objects, features and advantages of the present invention are readily apparent from the following detailed description of the best modes for carrying out the invention when taken in connection with the accompanying drawings.

BRIEF DESCRIPTION OF THE DRAWINGS

FIG. 2 is a schematic perspective view of a third unitary panel formed to define a cowl, an air intake plenum, a vehicle cross beam, a bulkhead, a hood and fenders.

DESCRIPTION OF THE PREFERRED EMBODIMENTS

Figure 1:
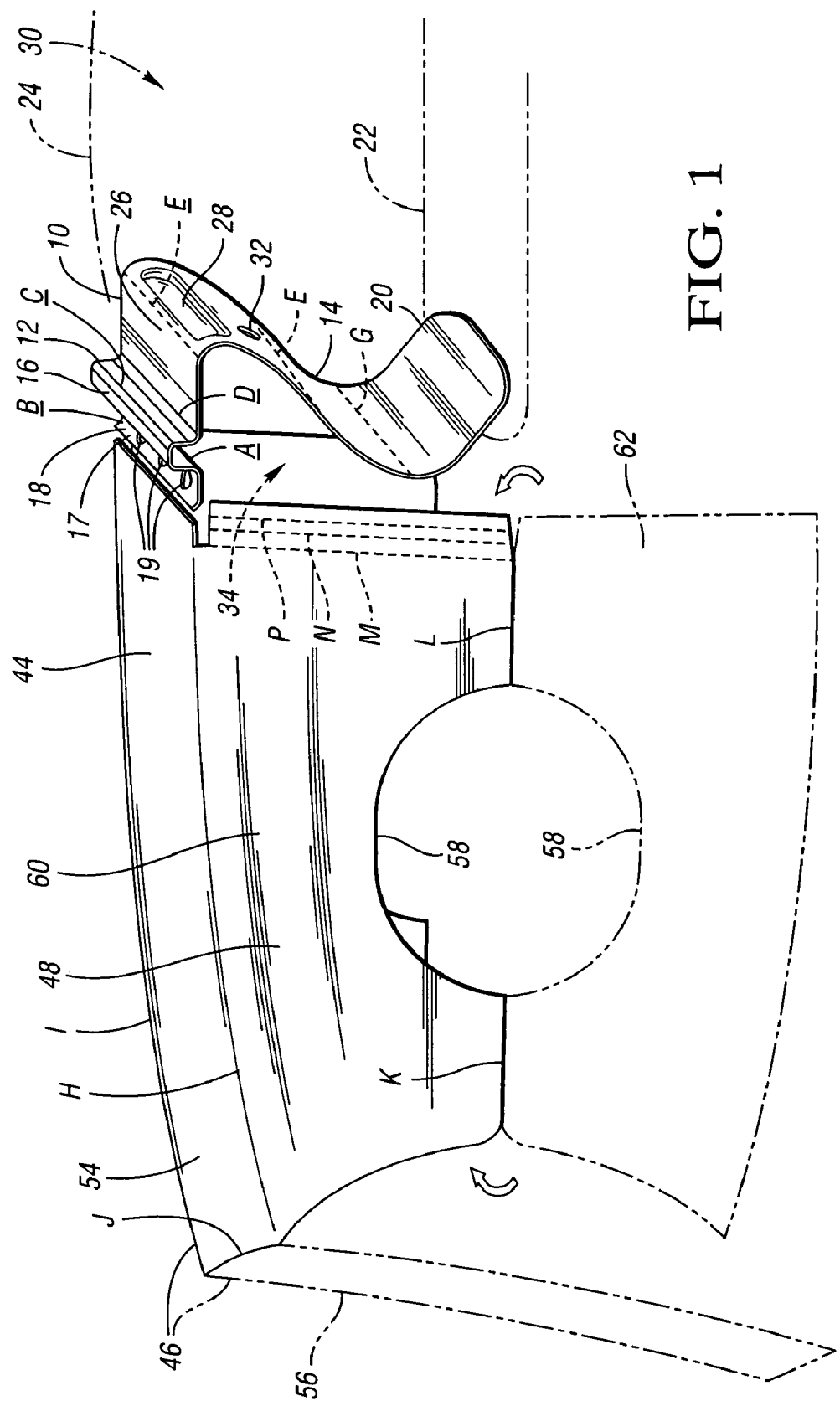
FIG. 1 is a schematic perspective view of a first unitary panel formed to define a cowl and a bulkhead and a second unitary panel formed to define a hood and opposing fenders.

Referring to the drawings, wherein like reference numbers refer to like components, FIG. 1 shows a first unitary panel 10 formed to define a cowl 12 and a bulkhead 14. The cowl 12 is formed with an optional, beam-like formation which serves as a structural cross beam 16. Thus, the cowl 12 and the cross beam 16 are integrated. The first panel 10 includes a hood-mounting flange 18 located forward of the cowl 12. An air intake plenum 17, partially formed and represented by air intake openings 19 is formed just rearward of the hood-mounting flange 18. The air intake plenum 17 allows air to pass into a front compartment 34 (such as an engine compartment) of the vehicle, for use in cooling and other vehicle functions. The cross beam 16 is formed between the plenum 17 and the bulkhead 14. Alternatively, the cross beam may be formed forward of the plenum, such that the plenum is between the cross beam and the bulkhead. The panel 10 is depicted schematically; it may have more or less curvature in different areas than is depicted. For instance, the cowl 12, plenum 17 and cross beam 16 portions of the panel 10 may have a more forward-arching shape that cooperates with and receives the arched shape of a windshield. Additionally, more curvature, formations and extensions may be formed into the panel 10 to enable interconnections with the windshield, with windshield wipers and with other vehicle components located in the same region as the panel 10.

The bulkhead 14 extends downward to form a floor-mounting flange 20, enabling it to be welded or otherwise adhered to a floor 22 of a vehicle 24. Alternatively, the bulkhead may extend only partway down to the floor 22. The bulkhead 14 and the floor 22 may be cooperatively formed to establish a transmission tunnel above a transmission located on the vehicle. The bulkhead 14 may serve as cross-car support structure. For example, the bulkhead 14 may directly, or via intermediary structure, connect with vehicle frame structure such as left and right front hinge pillars or A-pillars.

Additionally, the first panel 10 forms dashboard structure 26. The dashboard structure 26 may be configured to receive a separate dashboard module, or dashboard componentry. Alternatively, the dashboard structure 26 may serve as the dashboard itself, preferably being adapted to receive trim or padding as an outer dash surface.

Contouring of the first panel 10 provides instrument panel structure 28. The instrument panel structure 28 may be configured for attachment with respect to a separately assembled instrument panel (not shown) that is designed to mate with the contours of the instrument panel structure 28 (either directly or with intermediate structure, such as trim). Alternatively, the contours of the instrument panel structure 28 may be designed to directly receive and support instrumentation commonly found in an instrument panel (such as a fuel gauge and a speedometer). Appropriate openings may be formed or cut into the first panel 10 to provide mounting points for an instrument panel module, instrumentation and other vehicle components commonly found in the forward portion of a passenger compartment 30. For instance, a steering column opening 32 is shown in the first panel 10. The steering column opening 32 is sized to receive a steering column for the vehicle 24.

The first panel 10 separates the passenger compartment 30 from the front compartment 34 located forward of the first panel 10 on the vehicle 24 and is configured to allow componentry to pass between the passenger compartment 30 and the front compartment 34 as necessary (e.g., the steering column (not shown) passes through he first panel 10 at the steering column opening 32).

Notably, the first panel 10 is formed with a complex, contoured shape, enabling one, unitary panel to serve as the bulkhead 14, the cowl 12, the cross beam 16, the dashboard structure 26, and the instrument panel structure 28. The complex shape is achieved by a combination of specialized forming processes (quick plastic forming, superplastic forming or sheet hydroforming (described below)) and bending, where necessary. In achieving the shape of the first panel 10, bending may occur at numerous areas including lines A–P. The bending may create a defined edge, such as C or a more rounded contour, such as G. The forming process used may be able to achieve some of these lines A–G without a separate bending operation.

Those skilled in the art will recognize a variety of materials that may be employed to form the first panel 10, including various metals and plastics. Those skilled in the art will also recognize a variety of forming techniques that may be employed within the scope of the claimed invention to form the first panel 10, such as, but not limited to, stamping, injection molding, etc. However, quick plastic forming, superplastic forming, or sheet hydroforming is preferably employed to form the first panel 10 as a more complex shape than is generally obtainable with stamping may be achieved. Holes, apertures, and openings (such as the steering column opening 32 discussed above) are cut, punched, or otherwise made after the first panel 10 is formed.

Superplastic forming (SPF) is described in U.S. Pat. No. 5,974,847, issued Nov. 2, 1999 to Saunders, et al, which is hereby incorporated by reference in its entirety. When certain alloy compositions of steel or aluminum are suitably processed (such as with a very fine grain microstructure), they exhibit superplastic behavior at certain elevated temperatures. When deformed at these temperatures, the ductility (or elongation before yield or failure) of these materials exceeds several hundred percent. Such high levels of ductility can enable fabrication of very complex structures in a single sheet of material. A first panel 10 of the design discussed above can be fabricated in one piece using such techniques.

In addition to various steels and aluminum alloys, other structural materials such as zinc, brass, magnesium, titanium and their alloys have also been reported to exhibit superplastic behavior. Furthermore, certain polymers and reinforced polymer composites have the required ductility to make this first panel 10. These materials and other metal matrix composites could also be used to make the first panel 10 of this invention, if desired.

In an example of superplastic forming, a blank, i.e., a sheet, is tightly clamped at its edges between complementary surfaces of opposing die members. At least one of the die members has a cavity with a forming surface opposite one face of the sheet. The other die opposite the other face of the sheet forms a pressure chamber with the sheet as one wall to contain the working gas for the forming step. The dies and the sheet are heated to a suitable SPF condition for the alloy. For SPF aluminum alloys, this temperature is typically in the range of 400° C. to 550° C. Electric resistance heating elements are located in press platens or sometimes embedded in ceramic or metal pressure plates located between the die members and the platens. A suitable pressurized gas such as argon is gradually introduced into the die chamber on one side of the sheet, and the hot, relatively ductile sheet is stretched at a suitable rate until it is permanently reshaped against the forming surface of the opposite die. The rate of pressurization is controlled so the strain rates induced in the sheet being deformed are consistent with the required elongation for part forming. Suitable strain rates are usually 0.0001 to 0.01 $s^{-1}$. During the deformation of the sheet, gas is vented from the forming die chamber.

The '847 patent provides a method of stretch forming a ductile metal sheet into a complex shape involving significant deformation without excessive thinning of the sheet material and without tearing it. The method is particularly applicable to the stretch forming of superplastic alloys heated to a superplastic forming temperature. In the method, additional material from the initially flat sheet blank is pulled or drawn into the forming cavity for stretch forming. The additional material significantly reduces thinning and tearing in the formed part.

The method contributes to thickness uniformity in an SPF stretch-formed component by utilizing controlled draw-in of sheet metal to the forming chamber prior to application of gas pressure. In an illustrative practice, a preform, similar to a stationary male punch, is placed on the forming press platen opposite the die cavity. An aluminum blank, for example, is placed over the insert and heated to a suitable SPF temperature for the alloy. The die is then moved toward its closed position against the platen. In its closing motion, the die engages the edges of the aluminum sheet. The heated metal is pulled over and around the insert, and draw-in of blank material thus occurs. This results in a greater amount of metal in the die cavity prior to SPF blow forming. The quantity of additional metal can be managed by design of the size, shape and location of the preform on the platen or complementary die member. But the additional metal in the die cavity reduces the amount of strain required and, hence, the amount of thinning to form a desired geometry compared to conventional SPF.

Thus, by the judicious use of a suitable space-occupying metal preform on a die or platen member opposite the forming die, additional metal is easily drawn into the cavity during die closure without significantly increasing the complexity of the tooling. Care is taken in the design of the preform to avoid excessive wrinkling of the drawn-in metal and to maintain a tight gas seal at the periphery of the sheet upon full die closure. The uniformity in thickness of the stretch-formed part is improved. Mass of the formed part can be reduced because the designer does not need to resort to thicker blanks to assure part quality. And, except for the simple preform, there is no increase in the complexity of the SPF tooling.

Quick plastic forming (QPF) is described in U.S. Pat. No. 6,253,588, issued Jul. 3, 2001 to Rashid, et al, which is hereby incorporated by reference in its entirety. For quick plastic forming, a preferred alloy is Aluminum Alloy 5083 having a typical composition, by weight, of about 4% to 5% magnesium, 0.3 to 1% manganese, a maximum of 0.25% chromium, about 0.1% copper, up to about 0.3% iron, up to about 0.2% silicon, and the balance substantially all aluminum. Generally, the alloy is first hot and then cold rolled to a thickness from about one to about four millimeters.

In the AA5083 alloys, the microstructure is characterized by a principal phase of a solid solution of magnesium in aluminum with well-distributed, finely dispersed particles of intermetallic compounds containing the minor alloying constituents, such as $Al_6Mn$.

Using QPF, large AA5083-type aluminum-magnesium alloy sheet stock may be formed into a complex three-dimensional shape with high elongation regions, like an SPF-formed part, at much higher production rates than those achieved by SPF practices. The magnesium-containing, aluminum sheet is heated to a forming temperature in the range of about 400° C. to 510° C. (750° F. to 950° F.). The forming may often be conducted at a temperature of 460° C. or lower. The heated sheet is stretched against a forming tool and into conformance with the forming surface of the tool by air or gas pressure against the back surface of the sheet. The fluid pressure is preferably increased continuously or stepwise from 0 psi gage at initial pressurization to a final pressure of about 250 to 500 psi (gage pressure, i.e., above ambient pressure) or higher. During the first several seconds up to about, e.g., one minute of increasing pressure application, the sheet accommodates itself on the tool surface. After this initial period of pressurization to initiate stretching of the sheet, the pressure can then be increased at an even faster rate. Depending upon the size and complexity of the panel to be formed, such forming can normally be completed in a period of about two to twelve minutes, considerably faster than realized in superplastic forming. Thus, by working a suitably fine grained, aluminum alloy sheet at significantly lower temperatures and continuously increased, higher gas pressures than typical SPF practices, significantly faster and more practical forming (at least for the automobile industry) times are achieved.

Referring again to FIG. 1, a second unitary panel 44 includes a hood 46 and two opposing fenders (one left fender 48 shown extending downward from a left edge H of the hood 46). An opposing right fender extends from a right edge I of the hood. The right fender is a mirror image of the left fender 48 and need not be completely shown in order to describe the invention in an enabling manner. Aesthetic grooves may be formed into the panel 44. For instance, detailed grooves may be formed running adjacent to edges H and I, representing the gap formed adjacent to the edges of a traditional hood (i.e., a hood that ends at edges H and I).

The hood 46 has a hood outer panel portion 54 and an optional hood inner panel portion 56. The hood 46 may be bent at edge J, separating and defining the hood outer panel portion 54 and the hood inner panel portion 56. The hood inner panel portion 56 is rotated counter-clockwise until it is juxtaposed with the hood outer panel portion 54 and located inboard thereof. Edge J is the forward-most edge of the hood 46 after bending. The hood 46 thus has, in effect, two layers, enhancing its structural integrity. Alternatively, the second panel 44 may be formed of a material and thickness that provides sufficient hood strength with only one layer; thus the hood inner panel portion 56 may be omitted.

To define the fenders, the panel 44 is bent downward at edge H and edge I to define left fender 48 and the right fender (not shown). Optionally, each fender is formed with a wheel well cut-out 58. The left fender 48 is formed with a fender outer panel portion 60 and a fender inner panel portion 62. The fender 48 may be bent to define edges K and L, thus separating and defining the fender outer and inner panel portions 60, 62. The fender inner panel portion 62 is rotated upward until it is juxtaposed with the fender outer panel portion 60 and located inboard thereof. The left fender 48 thus has, in effect, two layers, enhancing its structural integrity. Alternatively, the left fender 48 may be formed of a material and thickness that provides sufficient fender strength with only one layer; thus the fender inner panel portion 62 may be omitted. The cut-out 58 may, optionally, be cut into the left fender 48 after bending at edges K, L.

The first and second panels 10, 44 may be configured to be adaptable for use on a vehicle employing either body-on-frame or body-frame-integral (also referred to as unibody) construction. As discussed above, the first panel 10 may be formed or bent to achieve the shape of cross beam 16. In this fashion, a frame-like component (i.e., the cross beam 16) designed to bear transverse loads is incorporated into the first panel 10. Similarly, the second panel 44 may be bent successively inward at M, N and P to form an integral pillar having a generally box-shaped cross-section. The integral pillar may serve as a front hinge pillar. Thus, the panels 10, 44 may incorporate structural frame elements, making them adaptable for use in body-frame-integral architecture.

Referring to FIG. 2, a third unitary panel 70 is formed to include a cowl 12', a bulkhead 14', a cross beam 16', an air intake plenum 17' partly formed by air intake openings 19', dashboard structure 26', instrument panel structure 28', a steering column opening 32', a hood 46' having a hood outer panel portion 54' and a hood inner panel portion 56', two opposing fenders, left fender 48' and right fender 49 (partially shown), each having a wheel well cut-out 58', a fender outer panel portion 60' and a fender inner panel portion 62'. Each of these components may be formed and bent into the panel 70 as described above with respect to first panel 10 and second panel 44. Because the third panel 70 is continuous between the plenum 17' and the hood 46', no hood-mounting flange (like flange 18' in FIG. 1) is necessary.

The third panel 70 also has some additional features not shown on first panel 10 or second panel 44. For instance, an access opening 72 is formed or cut into the hood 46'. An access door 74 is mountable to the hood 46' at door mount openings 76. The access door 74 may be connected to the hood by bolts, hinges, or other methods of attachment. Thus, if the hood 46 is optionally rigidly connected to a vehicle frame 82, the access opening 72 provides convenient access to the front compartment. The access door 74 may be located elsewhere on the hood 46' or on the third panel 70. Additionally, a front styling portion 83 may be formed or cut into the panel 70. The styling portion 83 may be bent to provide additional shaping near the front of the hood 46'.

Any portion or portions of the first panel 10, the second panel 44 or the third panel 70 may be reinforced by connecting thereto inner reinforcing structure (in the form of an additional panel or multiple reinforcing components, either of which may be corrugated for added strength). This reinforcement may be done prior to or after forming the panel to its desired shape. For instance, a separate panel may be formed that mates with the first, second, or third panel, the two panels thereby forming an inner and outer panel structure.

The vehicle frame 82 includes front hinge pillars 84, 84'. The front hinge pillars 84, 84' each have a forward edge 86, 86', respectively. The third panel 70 is configured such that, when the panel 70 is connected to the frame 82, the forward edges 86, 86' substantially continuously abut the third panel 70 at or near edges Q, Q', respectively. The connection of the third panel 70 to the frame 82 represents body-on-frame architecture. (The incorporation of the cross beam 16' into the third panel 70 represents body-frame-integral architecture). When connected in this manner, the bulkhead 14' separates the front compartment 34' from a passenger compartment 30' of the vehicle 24'.

As set forth in the claims, various features shown and described in accordance with the different embodiments of the invention illustrated may be combined.

While the best modes for carrying out the invention have been described in detail, those familiar with the art to which this invention relates will recognize various alternative designs and embodiments for practicing the invention within the scope of the appended claims.

What is claimed is:

1. Front structure for a vehicle comprising:
a unitary sheet formed to at least partially define a cowl and a vehicle bulkhead, wherein the unitary sheet is further configured to at least partially define a front compartment of the vehicle; and wherein said unitary sheet further defines structure at least partially forming a vehicle dashboard and configured for attachment with respect to an instrument panel.

2. Front structure for a vehicle comprising:
a unitary panel formed to at least partially define a cowl and a vehicle bulkhead, wherein the unitary panel is further configured to at least partially define a front compartment of the vehicle,
wherein said unitary panel further defines structure at least partially forming a vehicle dashboard and configured for attachment with respect to an instrument panel, and
wherein said unitary panel is formed using a method selected from the group consisting of quick plastic forming, superplastic forming and sheet hydroforming.

3. The front structure of claim 2, wherein said unitary panel further defines a hood configured to extend over and across the front compartment.

4. The front structure of claim 3, wherein said unitary panel is bendable to further define a hood inner panel portion and a hood outer panel portion, said hood inner panel portion being juxtaposed with said hood outer panel portion and located inboard thereof.

5. The front structure of claim 3, wherein said unitary panel is bendable to further define two opposing fender portions extending generally downward from said hood.

6. The front structure of claim 5, wherein each of said two opposing fender portions is bendable to define a fender outer panel portion and a fender inner panel portion, said fender inner panel portion being juxtaposed with said fender outer panel portion and being located inboard thereof.

7. The front structure of claim 3, wherein said hood defines an access opening for the front compartment, and further comprising an access door operatively connectable to said hood for opening and closing the access opening.

8. The front structure of claim 1, wherein said cowl is configured to extend across the front compartment, and wherein said bulkhead is configured to at least partially separate the front compartment from a passenger compartment of the vehicle.

9. The front structure of claim 1, wherein said cowl comprises a structural cross beam, said cross beam being configured to extend across the front compartment.

10. The front structure of claim 9, wherein said cowl forms an air intake plenum, and wherein said cross beam is formed between said plenum and said vehicle bulkhead.

11. The front structure of claim 1, wherein the vehicle includes two front hinge pillars each having a forward edge, and wherein said unitary sheet is configured such that the forward edge of each of said two front hinge pillars substantially continuously abuts said unitary sheet when said unitary sheet is operatively connected to the vehicle.

12. The front structure of claim 1, wherein said vehicle cowl forms an air intake plenum.

13. A body panel for a vehicle comprising:
   a unitary panel formed to at least partially define a hood, wherein said hood is bendable to define a hood outer panel portion and a hood inner panel portion, said hood inner panel portion being juxtaposed with said hood outer panel portion and being located inboard thereof, and wherein said unitary panel at least partially defines a front compartment of the vehicle; and
   wherein said unitary panel is bendable to further define two opposing fenders extending from said hood.

14. The body panel of claim 13, wherein said unitary panel is formed using a method selected from the group consisting of quick plastic forming, superplastic forming and sheet hydroforming.

15. The body panel of claim 13, wherein each of the two opposing fenders is bendable to define a fender outer panel portion and a fender inner panel portion, said fender inner panel portion being juxtaposed with said fender outer panel portion and being located inboard thereof.

16. Front structure for a vehicle comprising:
   a unitary panel formed to at least partially define a vehicle cowl, a vehicle bulkhead, a hood and two opposing fender portions extending from said hood, wherein said unitary panel is formed using a method selected from the group consisting of quick plastic forming, superplastic forming and sheet hydroforming, and wherein the unitary panel at least partially defines a front compartment of the vehicle.

17. A method of manufacturing front structure for a vehicle, the method comprising:
   forming a unitary panel using a method selected from the group consisting of quick plastic forming, superplastic forming and sheet hydroforming, wherein the unitary panel at least partially defines a vehicle cowl, a vehicle bulkhead, and a vehicle hood; and
   bending said unitary panel to define said cowl, said bulkhead, and said hood.

* * * * *